United States Patent
Miyamoto et al.

(10) Patent No.: US 8,653,709 B2
(45) Date of Patent: Feb. 18, 2014

(54) ROTATING ELECTRICAL MACHINE, LINEAR MOTION ELECTRICAL MACHINE, AND WIND GENERATOR SYSTEM

(75) Inventors: Yasuhiro Miyamoto, Fukuoka (JP); Hiroshi Tsumagari, Fukuoka (JP); Daisuke Morishita, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 365 days.

(21) Appl. No.: 13/047,812

(22) Filed: Mar. 15, 2011

(65) Prior Publication Data
US 2012/0025534 A1 Feb. 2, 2012

(30) Foreign Application Priority Data
Jul. 28, 2010 (JP) .................. 2010-169492

(51) Int. Cl.
*H02K 1/17* (2006.01)
*H02K 1/27* (2006.01)
*H02K 41/02* (2006.01)
*F03D 9/00* (2006.01)

(52) U.S. Cl.
USPC .............. 310/154.11; 310/12.24; 310/154.48; 310/156.18; 310/156.54; 310/216.084; 290/55

(58) Field of Classification Search
CPC .................. H02K 1/2476; H02K 2213/12
USPC ............ 310/154.09, 154.28–154.29, 154.36, 310/154.42, 154.47–154.48, 310/156.12–156.13, 156.18, 156.23, 310/156.48–156.52, 159.54–156.56, 310/156.59, 216.008–216.009, 12.24–12.26
See application file for complete search history.

(56) References Cited

U.S. PATENT DOCUMENTS

| 4,937,485 A | * | 6/1990 | Mihalko | ................. 310/208 |
| 5,994,814 A | | 11/1999 | Kawabata et al. | |

(Continued)

FOREIGN PATENT DOCUMENTS

| JP | 04-42743 | 2/1992 | |
| JP | 04185249 A | * 7/1992 | ............... H02K 1/27 |

(Continued)

OTHER PUBLICATIONS

Tanaka, JP005316673A Machine Translation, Nov. 1993.*

(Continued)

*Primary Examiner* — Burton Mullins
*Assistant Examiner* — Eric Johnson
(74) *Attorney, Agent, or Firm* — Ditthavong Mori & Steiner, P.C.

(57) ABSTRACT

This disclosure discloses a rotating electrical machine comprising: a stator; and a rotor; one of said stator and said rotor having a coil, the other having a plurality of magnetic pole units each forming first and second magnetic poles configured to be aligned alternately and to have mutually opposite polarities at a side of the one of said stator and said rotor, each of said magnetic pole units comprising: a unit core that a projecting part configured to protrude toward the side of the one of said stator and said rotor is formed; and a permanent magnetic provided between each of said projecting parts on the side of the one of said stator and said rotor from said unit core, said first magnetic pole being formed by said permanent magnet, and said second magnetic pole being formed by each of said projecting parts.

13 Claims, 14 Drawing Sheets

(56) References Cited

U.S. PATENT DOCUMENTS

| | | | |
|---|---|---|---|
| 6,661,147 B2 * | 12/2003 | Tajima et al. | 310/216.106 |
| 6,977,453 B2 * | 12/2005 | Yoda et al. | 310/156.46 |
| 2006/0290222 A1 * | 12/2006 | Shen et al. | 310/156.56 |
| 2009/0121572 A1 * | 5/2009 | Yang | 310/154.27 |
| 2009/0152957 A1 * | 6/2009 | Yang | 310/12 |

FOREIGN PATENT DOCUMENTS

| | | |
|---|---|---|
| JP | 05-316673 | 11/1993 |
| JP | 07-20050 U | 4/1995 |
| JP | 10-80116 | 3/1998 |
| JP | 10-174396 | 6/1998 |
| JP | 10-178752 | 6/1998 |
| JP | 2005-124289 | 5/2005 |
| JP | 2006-352973 | 12/2006 |

OTHER PUBLICATIONS

Japanese Office Action for corresponding JP Application No. 2010-169492, Nov. 25, 2010.

* cited by examiner

ROTATING ELECTRICAL MACHINE, LINEAR MOTION ELECTRICAL MACHINE, AND WIND GENERATOR SYSTEM

CROSS-REFERENCE TO RELATED APPLICATION

The present application claims priority from Japanese Patent Application No. 2010-169492, which was filed on Jul. 28, 2010, the disclosure of which is incorporated herein by reference in its entirety.

BACKGROUND OF THE INVENTION

1. Field of the Invention

The present invention relates to a rotating electrical machine, a linear motion electrical machine, and a wind generator system.

2. Description of the Related Art

Generally, in prior art rotating and linear motion electrical machines, one permanent magnet is used to form one magnetic pole.

SUMMARY OF THE INVENTION

According to the first aspect of the present invention, there is provided a rotating electrical machine comprising: a stator; and a rotor facing the stator and having a direction of rotation that is orthogonal to a direction facing to the stator; one of the stator and the rotor having a coil, the other of the stator and the rotor having a plurality of magnetic pole units aligned in the direction of rotation, the magnetic pole units each forming first and second magnetic poles configured to be aligned alternately in the direction of rotation and to have mutually opposite polarities at a side of the one of the stator and the rotor, each of the magnetic pole units comprising: a unit core that a projecting part configured to protrude toward the side of the one of the stator and the rotor is formed on both ends in the direction of rotation; and a permanent magnetic provided between each of the projecting parts on the side of the one of the stator and the rotor from the unit core, the first magnetic pole being formed by the permanent magnet, and the second magnetic pole being formed by each of the projecting parts adjacent along the direction of rotation.

According to the second aspect of the present invention, there is provided a rotating electrical machine comprising: a stator; and a rotor facing the stator and having a direction of rotation that is orthogonal to a direction facing to the stator; one of the stator and the rotor having a coil, the other of the stator and the rotor having magnetic pole forming means aligned in the direction of rotation, the magnetic pole forming means forming first and second magnetic pole configured to be aligned alternately in the direction of rotation and to have mutually opposite polarities at a side of the one of the stator and the rotor.

According to the third aspect of the present invention, there is provided a linear motion electrical machine comprising: a stator; and a mover facing the stator and having a direction of movement that is orthogonal to a direction facing to the stator; one of the stator and the mover having a coil, the other of the stator and the mover having a plurality of magnetic pole units aligned in the direction of movement, the magnetic pole units each forming first and second magnetic poles configured to be aligned alternately in the direction of movement and to have mutually opposite polarities at a side of the one of the stator and the mover, each of the magnetic pole units comprising: a unit core that a projecting part configured to protrude toward the side of the one of the stator and the mover is formed on both ends in the direction of movement; and a permanent magnetic provided between each of the projecting parts on the side of the one of the stator and the mover from the unit core; the first magnetic pole being formed by the permanent magnet; and the second magnetic pole being formed by each of the projecting parts adjacent along the direction of movement.

According to the fourth aspect of the present invention, there is provided a wind generator system having a generator, the generator comprising: a stator; and a rotor facing the stator and having a direction of rotation that is orthogonal to a direction facing to the stator; one of the stator and the rotor having a coil, the other of the stator and the rotor having a plurality of magnetic pole units aligned in the direction of rotation, the magnetic pole units each forming first and second magnetic poles configured to be aligned alternately in the direction of rotation and to have mutually opposite polarities at a side of the one of the stator and the rotor, each of the magnetic pole units comprising: a unit core that a projecting part configured to protrude toward the side of the one of the stator and the rotor is formed on both ends in the direction of rotation; and a permanent magnetic provided between each of the projecting parts on the side of the one of the stator and the rotor from the unit core; the first magnetic pole being formed by the permanent magnet; and the second magnetic pole being formed by each of the projecting parts adjacent along the direction of rotation.

DETAILED DESCRIPTION OF THE EMBODIMENTS

The following describes embodiments of the present invention with reference to accompanying drawings.

First Embodiment

Figure 1:
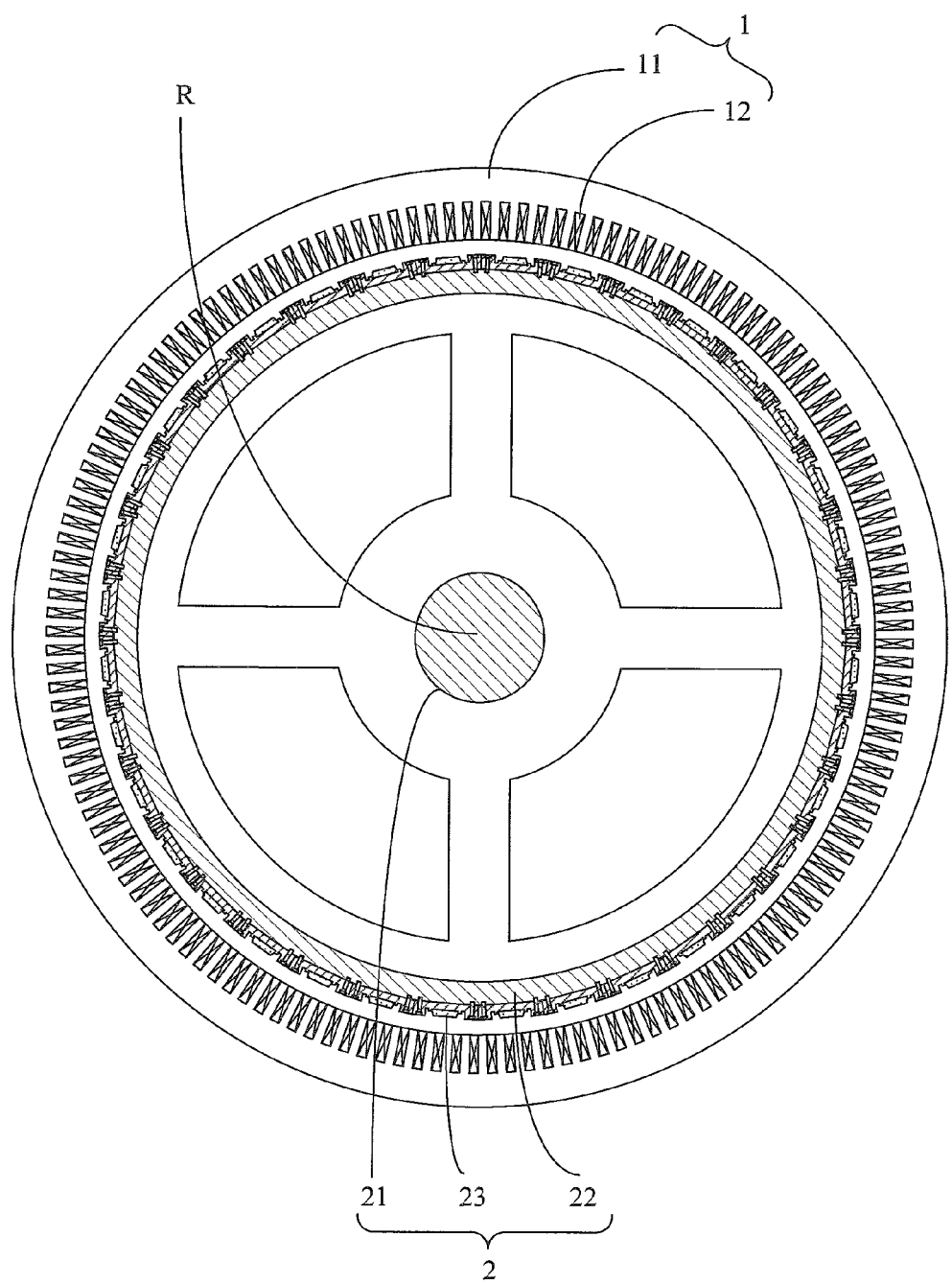
FIG. 1 is a front cross-sectional view of a rotating electrical machine according to the first embodiment.

This first embodiment describes a rotating electrical machine. The rotating electrical machine according to this embodiment may be a generator or an electric motor. The following describes an exemplary configuration of a rotating electrical machine according to this embodiment with reference to FIG. 1. FIG. 1 is a front cross-sectional view of a rotating electrical machine according to the first embodiment. FIG. 1 shows a cross-section of the rotating electrical machine when the rotating electrical machine is cut in a direction orthogonal to an axis of rotation R shown in FIG. 1.

In FIG. 1, the rotating electrical machine comprises a stator 1 and a rotor 2. The stator 1 comprises a stator core 11 and a coil 12, and surrounds the outer periphery of the rotor 2. The stator 1 faces the outer periphery of the rotor 2 via a gap. Magnetic poles are formed on the outer periphery of the rotor 2. Thus, in a case where the rotating electrical machine according to this embodiment is an electric motor, the rotor 2 rotates around the axis of rotation R by a rotating magnetic field generated by the coil 12. On the other hand, in a case where the rotating electrical machine according to this embodiment is a generator, the rotor 2 rotates around the axis of rotation R, causing voltage to be induced in the coil 12. The rotor 2 has a circular outer shape and rotates in the peripheral direction.

The rotor 2 has a shaft 21, a rotor core 22, and a magnetic pole unit 23. The rotor core 22 is provided to the outer periphery of the shaft 21. The magnetic pole unit 23 is aligned in the peripheral direction of the outer periphery of the rotor core 22, and is fixed to this outer periphery of the rotor core 22 by a bolt 233 described later. The rotor core 22 is a holding core that holds the magnetic pole unit 23.

Figure 2:
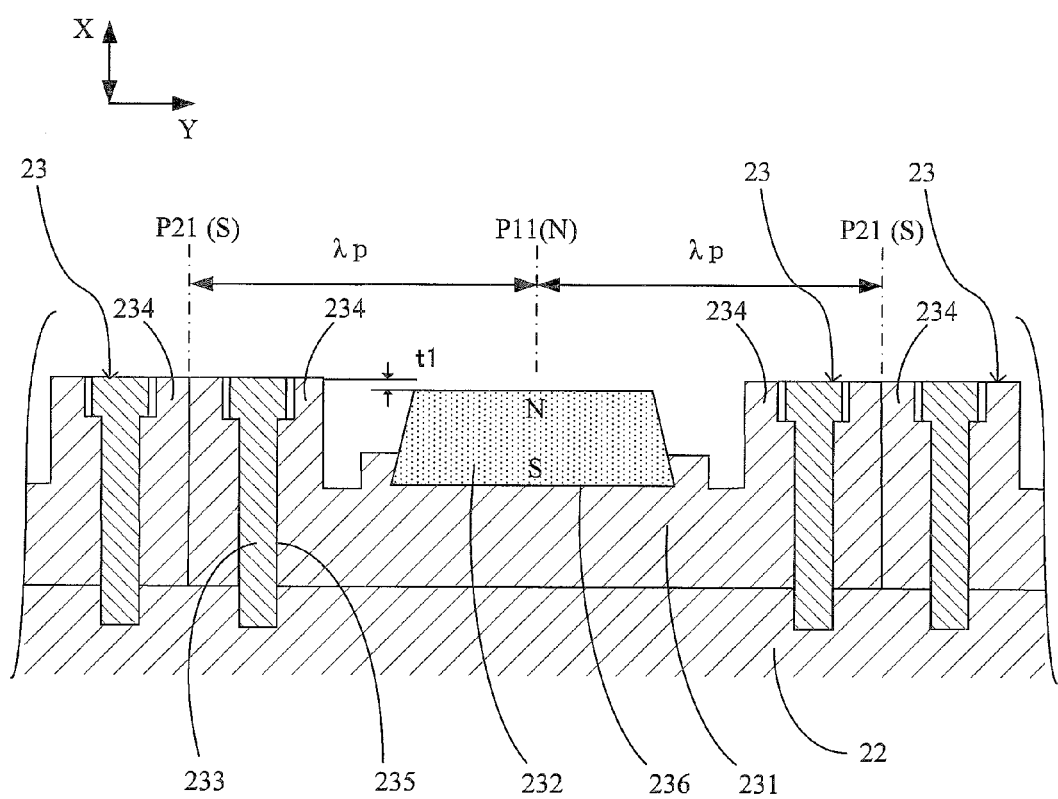
FIG. 2 is a partially enlarged view of a rotor according to the first embodiment.
Figure 3:
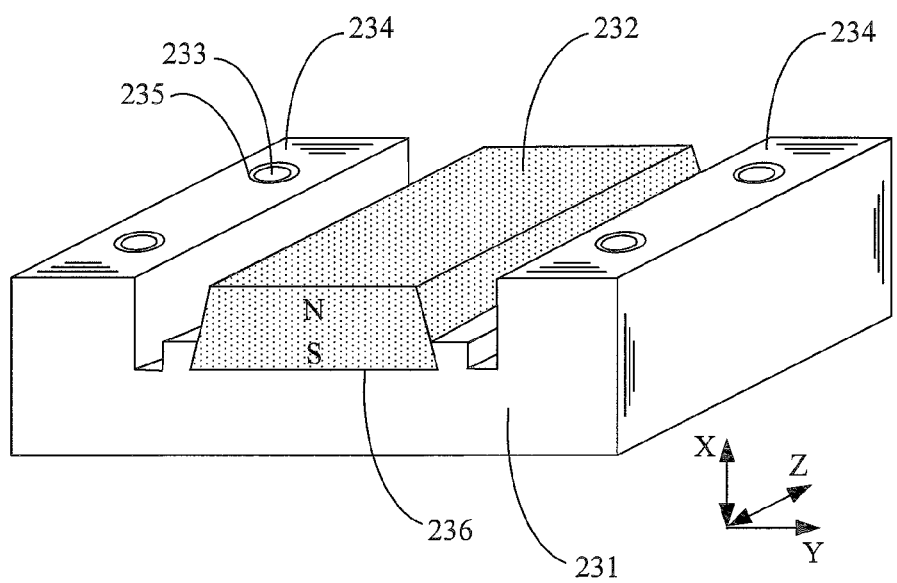
FIG. 3 is a perspective view of a magnetic pole unit according to the first embodiment.

Next, the detailed configuration of the magnetic pole unit 23 will be described with reference to FIG. 2 and FIG. 3. FIG. 2 is a partially enlarged view of the rotor 2 shown in FIG. 1. In FIG. 2, X denotes a facing direction in which the magnetic pole unit 23 faces the stator 1, and Y denotes the direction of rotation of the rotor 2. In FIG. 3, Z denotes the direction of the axis of rotation R. Direction X is a direction orthogonal to direction Y. Directions X and Y are directions orthogonal to direction Z. FIG. 3 is a perspective view of the magnetic pole unit 23 shown in FIG. 2.

In FIG. 2 and FIG. 3, the magnetic pole unit 23 comprises a unit core 231, a permanent magnet 232, and the bolt 233. The unit core 231 is a ferromagnetic substance, and is made of laminated magnetic steel sheets coated with an adhesive on both sides (an adhesive core), for example. The unit core 231 is manufactured by layering a predetermined quantity of the adhesive-coated magnetic steel sheets of a predetermined shape in the Z direction, and then subjecting the magnetic steel sheets of a predetermined shape thus laminated to heat treatment and pressurization. A projecting part 234 is formed on each end in the Y direction of the unit core 231. The projecting part 234 protrudes toward the stator 1 side. A bolt hole 235 in which the bolt 233 is inserted is formed in the projecting part 234. Two bolt holes 235 are formed on one projecting part 234, with each of the bolt holes 235 aligned in the Z direction. As a result, the magnetic pole unit 23 is fixed to the outer periphery of the rotor core 22 by the four bolts 233. The shape of the rotor core 22 side of the unit core 231 may be an arc following the outer peripheral shape of the rotor core 22, or may be flat. In a case where the shape of the rotor core 22 side of the unit core 231 is flat, a flat part may be provided to the outer periphery of the rotor core 22 as well.

The permanent magnet 232 has a trapezoidal cross-sectional shape, and is inserted into a groove part 236 formed on the unit core 231 and provided to the stator 1 side of the unit core 231. In addition, the permanent magnet 232 is disposed at the center of the unit core 231 in the Y direction, and between the projecting parts 234 aligned in the Y direction. The polarities of the stator 1 side and the unit core 231 side of the permanent magnet 232 are N and S, respectively. The projecting part 234 protrudes further toward the stator 1 side with a dimension t1 (See FIG. 2) than the face of the stator 1 side of the permanent magnet 232.

Next, the magnetic poles formed on the rotor 2 by the magnetic pole unit 23 will be described with reference to FIG. 2. The permanent magnet 232 forms a first magnetic pole P11. Here, with the N polarity of the stator 1 side of the permanent magnet 232, the polarity of the stator 1 side of the first magnetic pole P11 is also N. The two projecting parts 234 adjacent in the Y direction between one and another of the magnetic pole units 23 form a second magnetic pole P21 having convex polarity. The polarity of the stator 1 side of the second magnetic pole P21 is the same as the polarity of the unit core 231 side of the permanent magnet 232, and is thus S. With the magnetic pole units 23 forming such magnetic poles being aligned in the Y direction, the first magnetic pole P11 and the second magnetic pole P21 alternately aligned in the Y direction and forming mutually opposite polarities on the stator 1 side are formed on the outer periphery of the rotor 2. That is, when m (where m is a natural number) magnetic pole units 23 are aligned in the Y direction, the total number of magnetic poles becomes 2m. Then, the number of first magnetic poles P11 on which the permanent magnet 232 is formed is half (m) of the total number of magnetic poles, with the remaining half (m) made of the second magnetic poles P21 formed by the two projecting parts 234. Namely, in the embodiment, the magnetic pole forming means recited in the claims consist of the magnetic pole unit 23.

Thus, half ($\frac{1}{2}n=m$) of the total number of magnetic poles (n=2m) are made of the first magnetic pole P11 formed by the permanent magnet 232, and the remaining half ($\frac{1}{2}n=m$) are made of the second magnetic pole 21 formed by the projecting parts 234. Thus, the number of permanent magnets used can be halved compared to the aforementioned prior art.

Note that λp shown in FIG. 2 is the magnetic pole pitch between the first magnetic pole P11 and the second magnetic pole P21. In addition, in the example of FIG. 2, the projecting part 234 and the permanent magnet 232 both have a narrower width in the Y direction than $\frac{1}{2}\lambda p$, and a gap is formed between the projecting part 234 and the permanent magnet 232.

Thus, according to this embodiment, half of the total number of magnetic poles are made of the first magnetic pole P11 formed by the permanent magnet 232, and the remaining half are made of the second magnetic pole P21 formed by the projecting parts 234. With this arrangement, the number of permanent magnets used can be halved in comparison to the aforementioned prior art, making it possible to easily reduce permanent magnet usage.

Further, the permanent magnet used in a rotating electrical machine is often, in general, a conductive rare earth magnet having Nd—Fe—B as its main component. In such a case, eddy current loss occurs in the interior of the permanent magnetic, resulting in a reduction in efficiency. Nevertheless, according to this embodiment, the number of permanent magnets used can be halved in comparison to the aforementioned prior art, making it possible to decrease the eddy current loss that occurs in the permanent magnets by approximately half for the overall rotating electrical machine. This makes it possible to improve the efficiency of the rotating electrical machine.

Furthermore, the second magnetic pole P21 has convex polarity. As a result, in a case where the rotating electrical machine is a generator, vector control that shifts the current phase with respect to the induced voltage vector in the advancing direction is performed, making it possible to obtain an output margin of approximately 30%. As a result, the amount of power generated can be increased using the same size.

Further, according to this embodiment, the unit core 231 is made of laminated magnetic steel sheets. With this arrangement, it is possible to further reduce the amount of eddy current loss.

Further, according to this embodiment, magnetic steel sheets referred to as an adhesive core are used for the unit core 231. With this arrangement, the rigidity and strength of the unit core 231 are improved, making it possible to directly and easily form the bolt hole 235 in the unit core 231. Then, the bolt 233 can be inserted into this bolt hole 235 to fix the magnetic pole unit 23 to the outer periphery of the rotor core 22. According to the aforementioned prior art, the magnetized permanent magnet is directly fixed to the rotor surface using adhesive. Then, a magnet restraining member is provided between the permanent magnets. In such a case, the permanent magnets are fixed to the rotor surface after being magnetized. This, however, readily causes a shift in the permanent magnet position, requiring the magnet repressing member to be prepared separately from the permanent magnet, making permanent magnet fixation difficult. In response, according to this embodiment, the magnetic pole unit 23 is used, simplifying the workability of this fixation process.

Further, according to this embodiment, the projecting part 234 protrudes further toward the stator 1 side with the dimension t1 than the face of the stator 1 side of the permanent magnet 232. As a result, when the rotor 2 is inserted into the inner peripheral side of the stator 1 from the direction of the axis of rotation R, the permanent magnet 232 does not readily contact the stator 1, making it easy to prevent damage to the permanent magnet 232 during insertion.

Further, with a rotating electrical machine having a large diameter, there are a larger number of magnetic poles, making the advantages achieved according to the above-described embodiment even more remarkable.

Figure 4:
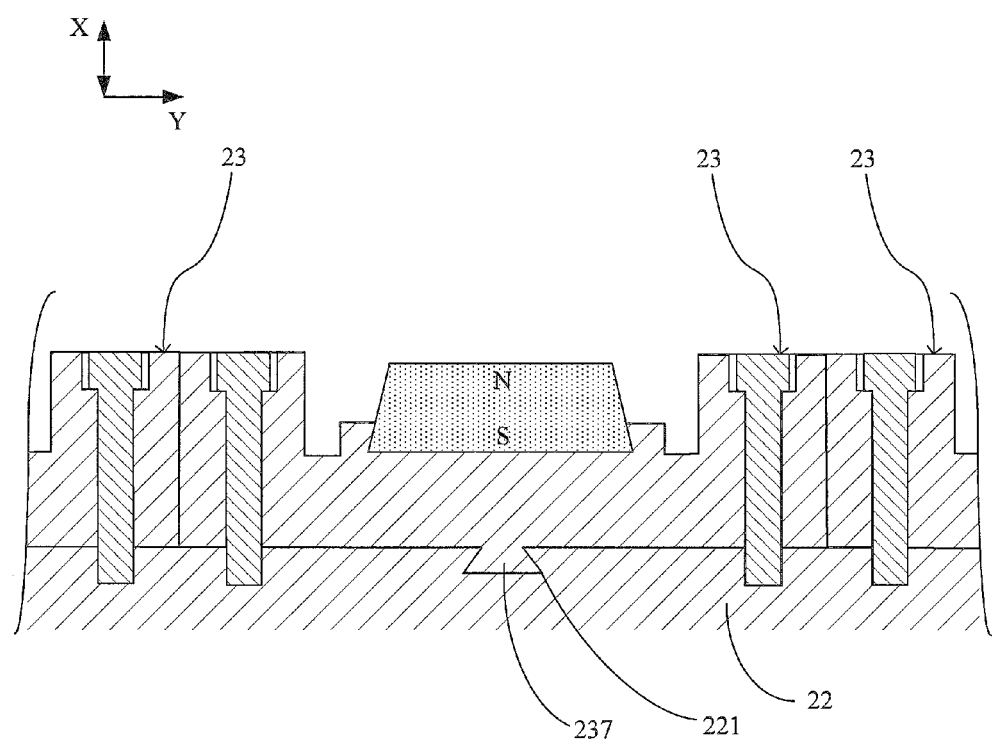
FIG. 4 is a front cross-sectional view of a magnetic pole unit of another configuration.

Note that a convex part 237 may be formed on the aforementioned magnetic pole unit 23, and a recessed part 221 capable of engaging with the convex part 237 may be formed on the rotor core 22, as shown in FIG. 4. FIG. 4 is a front cross-sectional view of the magnetic pole unit 23 of another configuration. In this case, the magnetic pole unit 23 is fixed by the convex part 237 in addition to the bolt 233, making fixation of magnetic pole unit 23 even stronger.

Further, while according to the above the magnetic pole unit 23 is fixed to the outer periphery of the rotor core 22 by the four bolts 233, the present invention is not limited thereto. For example, the bolt 233 is not limited to the quantity of four, allowing any quantity. There may be one bolt 233 per projecting part 234, i.e., two total, or three bolts 233 per projecting part 234, i.e., six total, for example. Or, the bolt 233 may be omitted, and the magnetic pole unit 23 secured by an adhesive, for example. In such a case as well, the fact that a magnet suppressing member is not used as in the case in the aforementioned prior art increases the workability of the fixation process.

Further, while according to the above, the polarities of the stator 1 side and the unit core 231 side of the permanent magnet 232 are N and S, respectively, the present invention is not limited thereto. The polarity of the stator 1 side of the permanent magnet 232 may be S, and the polarity of the unit core 231 side may be N.

Further, while according to the above the coil 12 is provided to the stator 1 and the magnetic pole unit 23 is provided to the rotor 2, the present invention is not limited thereto. The coil 12 may be provided to the rotor 2, and the magnetic pole unit 23 may be provided to the stator 1. In such a case, the stator core 11 becomes the holding core that holds the magnetic pole unit 23.

Further, while according to the above the structure is an inner rotor structure wherein the rotor 2 is provided to the inner peripheral side of the stator 1 and rotates on the inner peripheral side of the stator 1, the present invention is not limited thereto. The structure may be an outer rotor structure wherein the rotor 2 is provided to the outer peripheral side of the stator 1 and rotates on the outer peripheral side of the stator 1. That is, the structure may be the structure shown in FIG. 1, with the stator 1 and the rotor 2 reversed.

Second Embodiment

Figure 5:
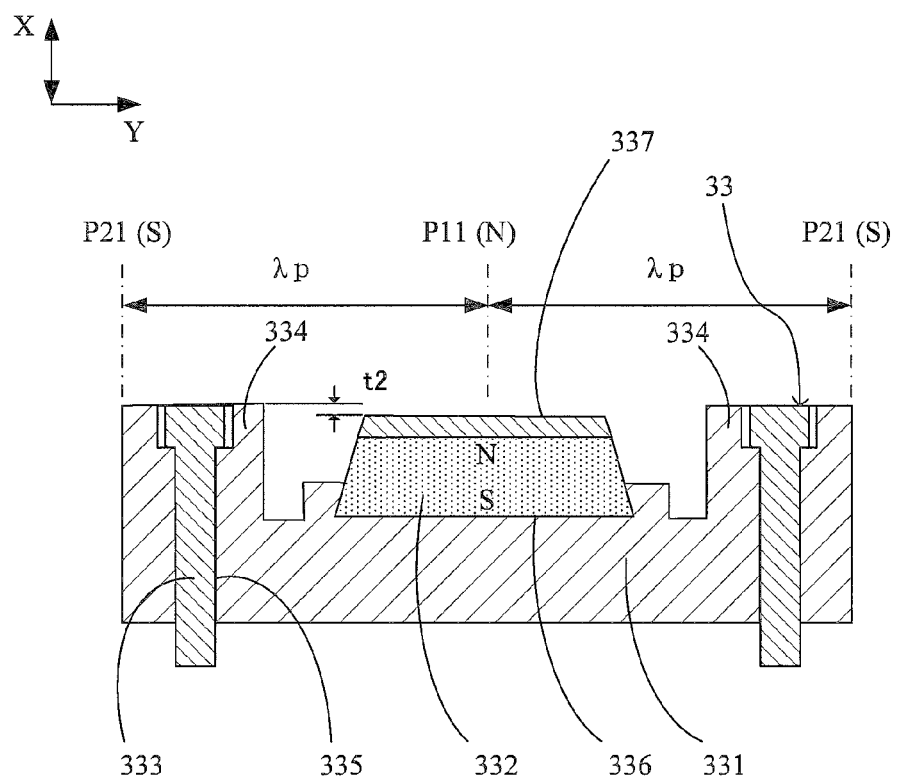
FIG. 5 is a front cross-sectional view of a magnetic pole unit according to the second embodiment.
Figure 6:
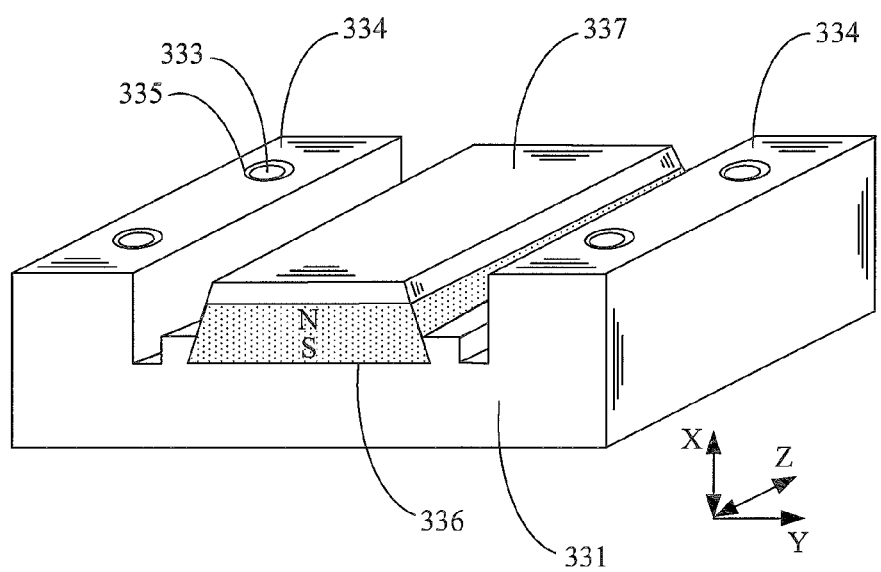
FIG. 6 is a perspective view of a magnetic pole unit according to the second embodiment.

In this embodiment, a magnetic pole unit having a structure different from the magnetic pole unit according to the first embodiment will be described. FIG. 5 is a front cross-sectional view of the magnetic pole unit according to the second embodiment, and FIG. 6 is a perspective view of the magnetic pole unit according to the second embodiment. In FIG. 5 and FIG. 6, X denotes the same direction as direction X shown in FIG. 2 and FIG. 3, Y denotes the same direction as direction Y shown in FIG. 2 and FIG. 3, and Z denotes the same direction as direction Z shown in FIG. 3.

In FIG. 5 and FIG. 6, a magnetic pole unit 33 comprises a unit core 331, a permanent magnet 332, a bolt 333, and a unit core piece 337. The components other than the permanent magnet 332 and the unit core piece 337 are the same as those of the magnetic pole unit 23 shown in FIG. 2 and FIG. 3, and descriptions thereof will be omitted.

The permanent magnet 332 has a trapezoidal cross-sectional shape, and is inserted into a groove part 336 formed on the unit core 331 and provided to the stator 1 side of the unit core 331. In addition, the permanent magnet 332 is disposed at the center of the unit core 331 in the Y direction, and between projecting parts 334 aligned in the Y direction. The polarities of the stator 1 side and the unit core 331 side of the permanent magnet 332 are N and S, respectively.

The unit core piece 337 is made of magnetic steel sheets laminated in the Z direction. The unit core piece 337 is fixed to the surface of the stator 1 side of the permanent magnet 332 by adhesive, etc. The projecting part 334 protrudes further toward the stator 1 side with a dimension t2 (See FIG. 5) than the face of the stator 1 side of the unit core piece 337.

Next, the magnetic poles formed on the rotor 2 by the magnetic pole unit 33 will be described with reference to FIG. 5. The permanent magnet 332 forms the first magnetic pole P11. Here, with the N polarity of the stator 1 side of the permanent magnet 332, the polarity of the stator 1 side of the first magnetic pole P11 is also N. The two projecting parts 334 adjacent in the Y direction form the second magnetic pole P21 having convex polarity. The polarity of the stator 1 side of the second magnetic pole P21 is the same as the polarity of the unit core 331 side of the permanent magnet 332, and is thus S. With the magnetic pole units 33 forming such magnetic poles being aligned in the Y direction, the first magnetic pole P11 and the second magnetic pole P21 alternately aligned in the Y direction and forming mutually opposite polarities on the stator 1 side are formed on the outer periphery of the rotor 2.

Namely, in the embodiment, the magnetic pole forming means recited in the claims consist of the magnetic pole unit 33.

Note that λp shown in FIG. 5 is the magnetic pole pitch between the first magnetic pole P11 and the second magnetic pole P21, similar to λp shown in FIG. 2. In addition, in the example of FIG. 5, the projecting part 334 and the permanent magnet 332 are both narrower in the Y direction than ½λp, and a gap is formed between the projecting part 334 and the permanent magnet 332.

Thus, according to this embodiment, the unit core piece 337 that is made of laminated magnetic steel sheets is provided to the face of the stator 1 side of the permanent magnet 332. As a result, it is possible to reduce the eddy current loss, which occurs when conductive permanent magnets are used, to a greater degree than in the first embodiment. This makes it possible to further improve the efficiency of the rotating electrical machine.

Further, according to this embodiment, the projecting part 334 protrudes further toward the stator 1 side with the dimension t2 than the face of the stator 1 side of the unit core piece 337. As a result, when the rotor 2 is inserted into the inner peripheral side of the stator 1 from the direction of the axis of rotation R, the unit core piece 337 does not readily contact the stator 1, making it easy to suppress damage to the unit core piece 337 and the permanent magnet 332 during insertion.

Though not particularly described in the above, the unit core piece 337 may be laminated magnetic steel sheets coated with an adhesive on both sides (an adhesive core), similar to the first embodiment.

Further, while according to the above the polarities of the stator 1 side and the unit core 331 side of the permanent magnet 332 are N and S, respectively, the present invention is not limited thereto. The polarity of the stator 1 side of the permanent magnet 332 may be S, and the polarity of the unit core 331 side may be N.

Third Embodiment

Figure 7:
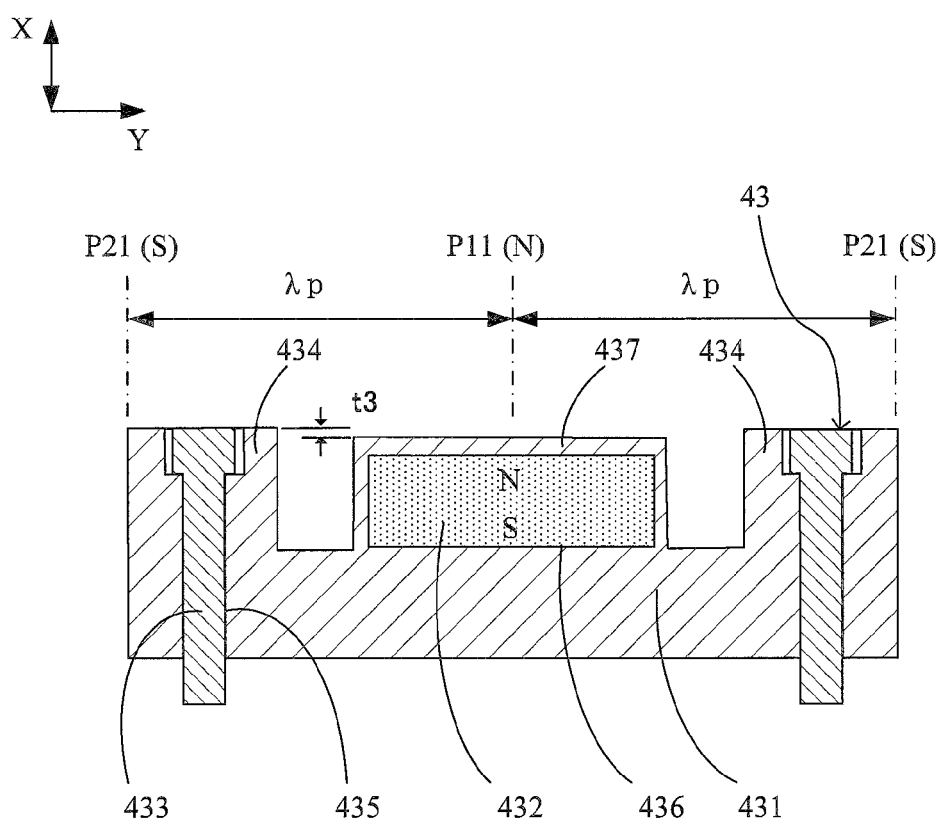
FIG. 7 is a front cross-sectional view of a magnetic pole unit according to the third embodiment.
Figure 8:
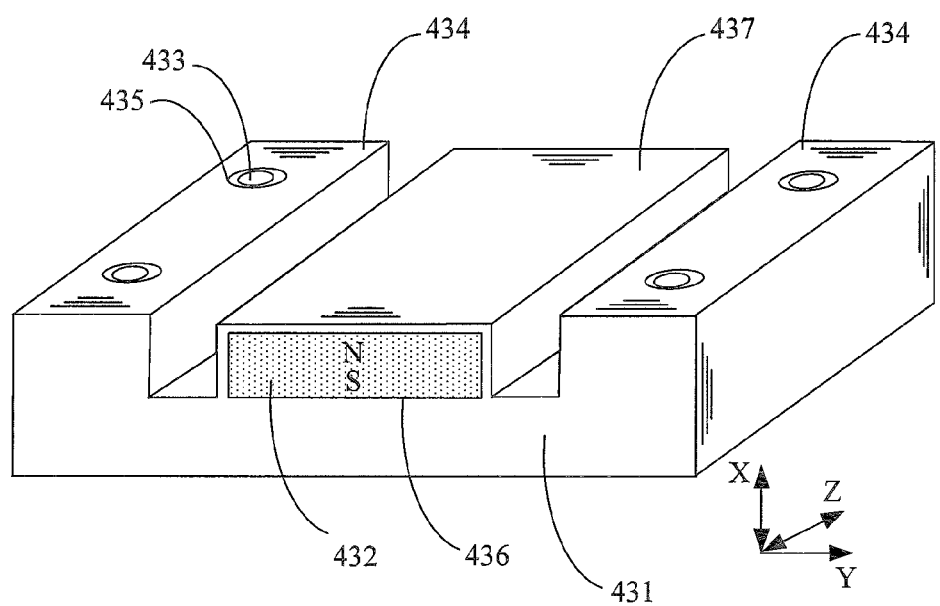
FIG. 8 is a perspective view of a magnetic pole unit according to the third embodiment.

In this embodiment, a magnetic pole unit having a structure different from the magnetic pole unit according to the first and second embodiments will be described. FIG. 7 is a front cross-sectional view of the magnetic pole unit according to the third embodiment, and FIG. 8 is a perspective view of the magnetic pole unit according to the third embodiment. In FIG. 7 and FIG. 8, X denotes the same direction as direction X shown in FIG. 2 and FIG. 3, Y denotes the same direction as direction Y shown in FIG. 2 and FIG. 3, and Z denotes the same direction as direction Z shown in FIG. 3.

In FIG. 7 and FIG. 8, a magnetic pole unit 43 comprises a unit core 431, a permanent magnet 432, and a bolt 433. The components other than the unit core 431 and the permanent magnet 432 are the same as those of the magnetic pole unit 23 shown in FIG. 2 and FIG. 3, and descriptions thereof will be omitted.

The unit core 431 is a ferromagnetic substance, and is made of laminated magnetic steel sheets coated with an adhesive on both sides (an adhesive core), for example. The unit core 431 is manufactured by layering a predetermined quantity of the adhesive-coated magnetic steel sheets of a predetermined shape in the Z direction, and then subjecting the magnetic steel sheets of a predetermined shape thus laminated to heat treatment and pressurization. A projecting part 434 is formed on each end in the Y direction of the unit core 431. The projecting part 434 protrudes toward the stator 1 side with a dimension t3 (See FIG. 7). A bolt hole 435 in which a bolt 433 is inserted is formed in the projecting part 434. Heretofore, this embodiment is the same as the first embodiment.

The permanent magnet 432 has a rectangular cross-sectional shape, and is inserted into a magnet hole 436 formed in the unit core 431. The magnet hole 436 is formed in an insertion part 437 that protrudes toward the stator 1 side of the unit core 431. With this arrangement, a part of the insertion part 437 made of the laminated magnetic steel sheets exists on the face of the stator 1 side of the permanent magnet 432. The insertion part 437 is disposed at the center of the unit core 431 in the Y direction, and between the projecting parts 434 aligned in the Y direction. The polarities of the stator 1 side and the unit core 231 side of the permanent magnet 432 are N and S, respectively. The projecting part 434 protrudes further toward the stator 1 side than the face of the stator 1 side of the insertion part 437. Namely, in the embodiment, the magnetic pole forming means recited in the claims consist of the magnetic pole unit 43.

Next, the magnetic poles formed on the rotor 2 by the magnetic pole unit 43 will be described with reference to FIG. 7. The permanent magnet 432 forms the first magnetic pole P11. Here, with the N polarity of the stator 1 side of the permanent magnet 432, the polarity of the stator 1 side of the first magnetic pole P11 is also N. The two projecting parts 434 adjacent in the Y direction form the second magnetic pole P21 having convex polarity. The polarity of the stator 1 side of the second magnetic pole P21 is the same as the polarity of the unit core 431 side of the permanent magnet 432, and is thus S. With the magnetic pole units 43 forming such magnetic poles being aligned in the Y direction, the first magnetic pole P11 and the second magnetic pole P21 alternately aligned in the Y direction and forming mutually opposite polarities on the stator 1 side are formed on the outer periphery of the rotor 2.

Note that λp shown in FIG. 7 is the magnetic pole pitch between the first magnetic pole P11 and the second magnetic pole P21, similar to λp shown in FIG. 2. In addition, in the example of FIG. 7, the projecting part 434 and the insertion part 437 both have narrower widths in the Y direction than ½λp, and a gap is formed between the projecting part 434 and the insertion part 437.

Thus, according to the embodiment, the insertion part 437 made of the laminated magnetic steel sheets exists on the face of the stator 1 side of the permanent magnet 432. As a result, it is possible to reduce the eddy current loss, which occurs when conductive permanent magnets are used, to a greater degree than in the first embodiment. This makes it possible to further improve the efficiency of the rotating electrical machine.

Further, according to this embodiment, the permanent magnet 432 is covered by the insertion hole 437, making it easy to prevent detachment of the permanent magnet 437 caused by the centrifugal force during rotation.

Further, according to this embodiment, the projecting part 434 protrudes further toward the stator 1 side than the face of the stator 1 side of the insertion part 437. As a result, when the rotor 2 is inserted into the inner peripheral side of the stator 1 from the direction of the axis of rotation R, the insertion part 437 does not readily contact the stator 1, making it easy to suppress damage to the insertion part 437 and the permanent magnet 332 during insertion.

Fourth Embodiment

Figure 9A:
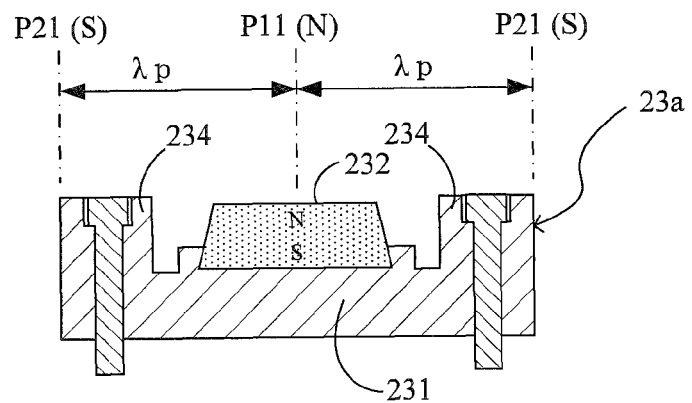
FIG. 9A is a front cross-sectional view of a magnetic pole unit according to the fourth embodiment.
Figure 9B:
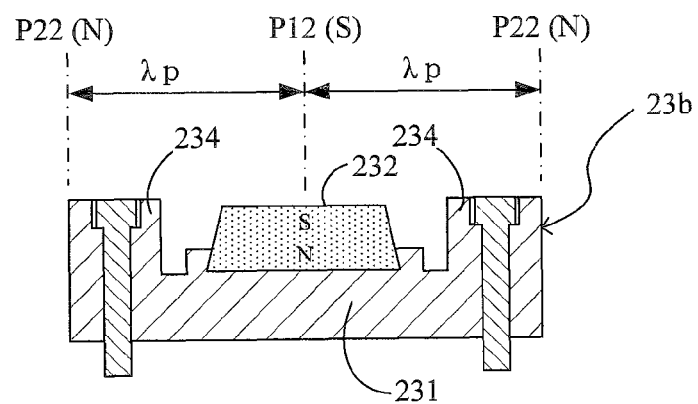
FIG. 9B is a front cross-sectional view of a magnetic pole unit according to the fourth embodiment.
Figure 10:
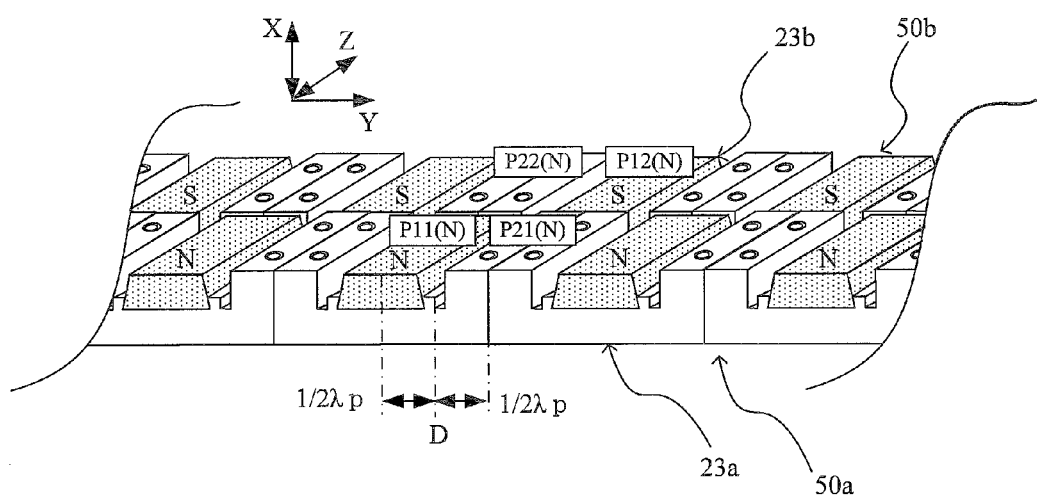
FIG. 10 is a layout view of a magnetic pole unit according to the fourth embodiment.

In this embodiment, the arrangement of the magnetic pole units in the direction of the axis of rotation R according to the first to third embodiments will be described. In this embodiment, description will be made using the magnetic pole units according to the first embodiment as an example. FIG. 9A and FIG. 9B are front cross-sectional views of a magnetic pole unit according to the fourth embodiment. FIG. 10 is a layout view of a magnetic pole unit according to the fourth embodiment. In FIG. 10, X denotes the same direction as direction X shown in FIG. 2 and FIG. 3, Y denotes the same direction as direction Y shown in FIG. 2 and FIG. 3, and Z denotes the same direction as direction Z shown in FIG. 3.

As shown in FIG. 9A and FIG. 9B, two types of magnetic pole units, 23a and 23b, are prepared as the magnetic pole unit 23. The magnetic pole unit 23a is given a polarity of N on the stator 1 side and a polarity of S on the unit core 231 side of the permanent magnet 232. In the magnetic pole unit 23a, the first magnetic pole P11 having a polarity of N on the stator 1 side is formed by the permanent magnet 232. The second magnetic pole P21 having a polarity of S on the stator 1 side is formed by the projecting parts 234.

The magnetic pole unit 23b is given a polarity of S on the stator 1 side and a polarity of N on the unit core 231 side of the permanent magnet 232. In the magnetic pole unit 23b, a first magnetic pole P12 having a polarity of S on the stator 1 side is formed by the permanent magnet 232. A second magnetic pole P22 having a polarity of N on the stator 1 side is formed by the projecting parts 234.

The magnetic pole unit 23a thus configured constitutes a first unit group 50a aligned in the Y direction, as shown in FIG. 10. The first magnetic pole P11 and the second magnetic pole P21 alternately aligned in the Y direction and having mutually opposite polarities on the stator 1 side are formed around the outer periphery of the rotor 2 by the first unit group 50a. On the other hand, the magnetic pole unit 23b thus configured constitutes a second unit group 50b aligned in the Y direction, as shown in FIG. 10. The second unit group 50b is aligned in the Z direction of the first unit group 50a. The first magnetic pole P12 and the second magnetic pole P22 alternately aligned in the Y direction and having mutually opposite polarities on the stator 1 side are formed around the outer periphery of the rotor 2 by the second unit group 50b.

Note that the magnetic pole unit 23b is disposed in a position that deviates from the Y direction by an amount equivalent to one magnetic pole pitch λp with respect to the magnetic pole unit 23a, i.e., a position deviated 180° in terms of the electrical angle phase. With this arrangement, the first magnetic pole P11 and the second magnetic pole 22 are disposed in the same position, and the second magnetic pole P21 and the first magnetic pole P12 are disposed in the same position, as viewed from the Z direction.

Figure 11:
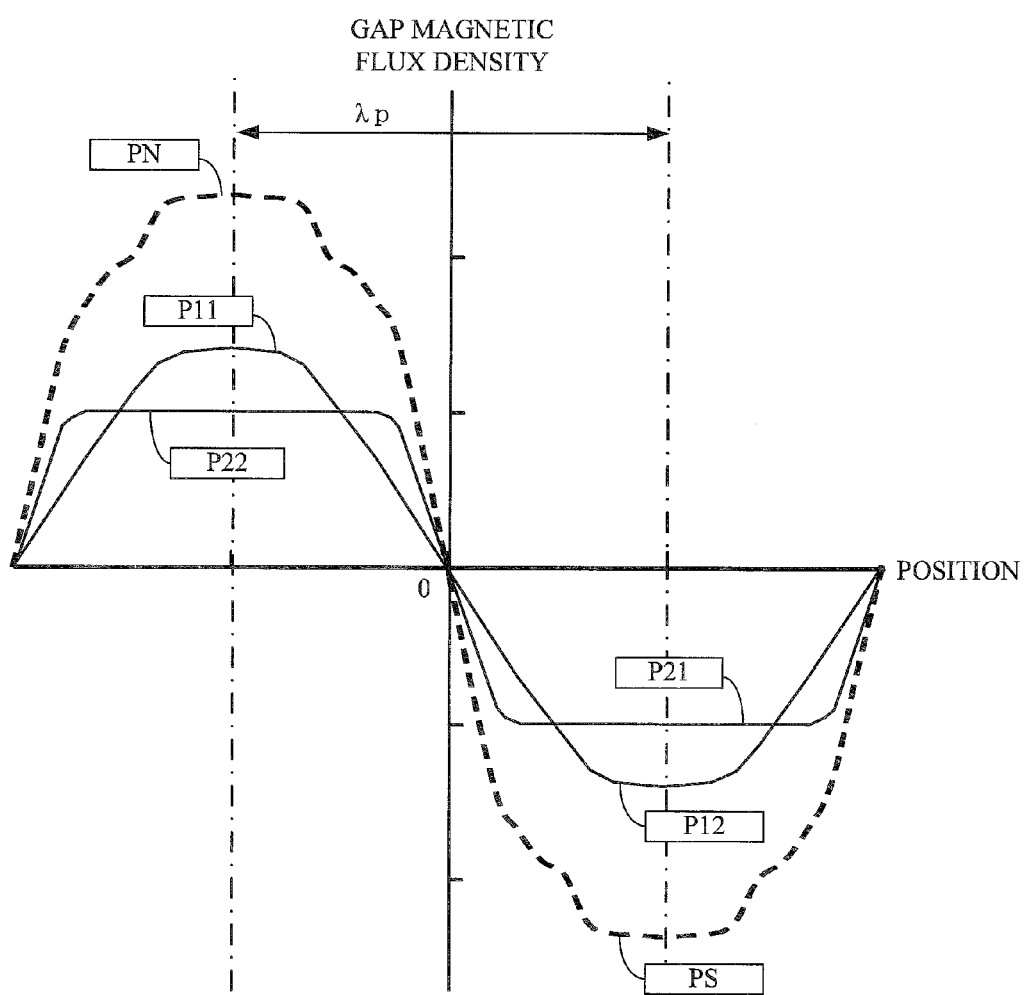
FIG. 11 is a view showing the gap magnetic flux distribution.

FIG. 11 is diagram showing the magnetic flux distribution within the gap (hereinafter referred to as the gap magnetic flux distribution). In FIG. 11, the vertical axis indicates the gap magnetic flux density, and the horizontal axis indicates the position in the Y direction. Point D shown in FIG. 10 is the point of ½λp separation from the center of the first magnetic pole P11, and is positioned at "0" in FIG. 11.

As shown in FIG. 11, the gap magnetic flux distribution of the first magnetic pole (P11, P12) forms a substantial sine wave, and the gap magnetic flux distribution of the second magnetic pole (P21, P22) forms a substantial trapezoidal wave, resulting in gap magnetic flux distributions that are different from each other. Correspondingly, according to this embodiment, the first magnetic pole P11 and the second magnetic pole 22 are disposed in the same position, and the second magnetic pole P21 and the first magnetic pole P12 are disposed in the same position, as viewed from the Z direction. With this arrangement, an N pole magnetic flux distribution PN that combines the gap magnetic flux distributions of the first magnetic pole P11 and the second magnetic pole 22, and an S pole magnetic flux distribution PS that combines the gap magnetic flux distributions of the second magnetic pole P21 and the first magnetic pole 12 form waveforms that are substantially identical, making it possible to form a wave that approaches an overall sine wave. With this arrangement, it is possible to reduce the harmonic content included in the gap magnetic flux distribution, and further improve the efficiency of the rotating electrical machine. In a case where the rotating electrical machine is a generator, the form factor of the induced voltage waveform is improved.

Note that while according to the above the first unit group 50a and the second unit group 50b are used in a quantity of one each and aligned in the Z direction, a plurality of each may be used and aligned in the Z direction. While the order in which the first unit group 50a and the second unit group 50b are aligned is arbitrary, use of the same number of the first unit groups 50a and the second unit groups 50b makes it possible to form the N pole magnetic flux distribution PN and the S pole magnetic flux distribution PS into substantially the same waveform.

Figure 12:
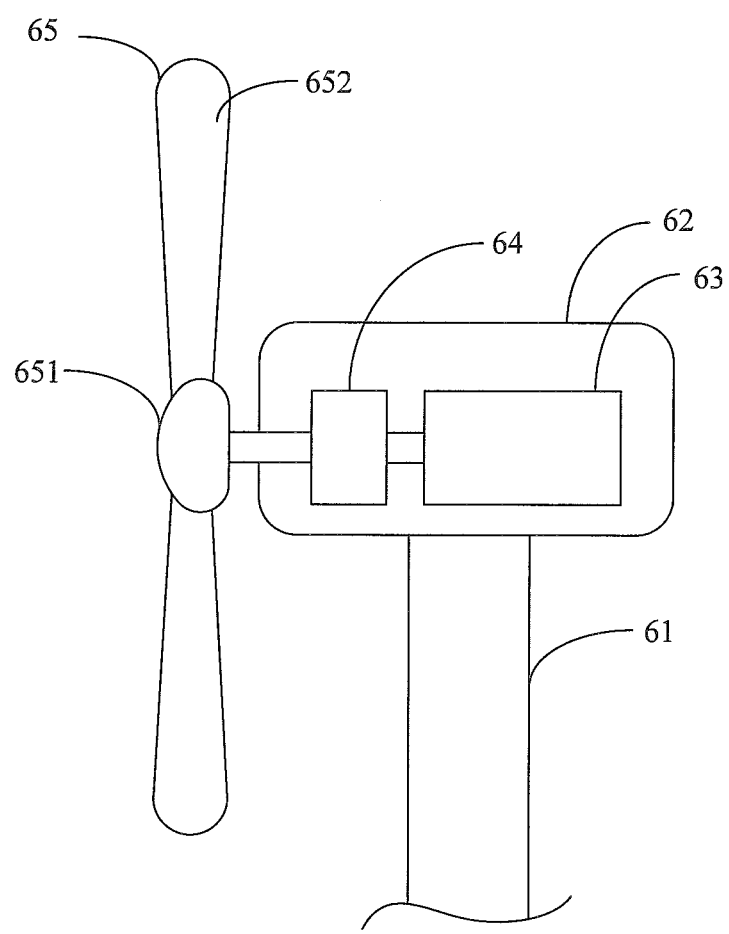
FIG. 12 is a diagram showing an overview of a wind generator system having an accelerating gear and a generator.
Figure 13:
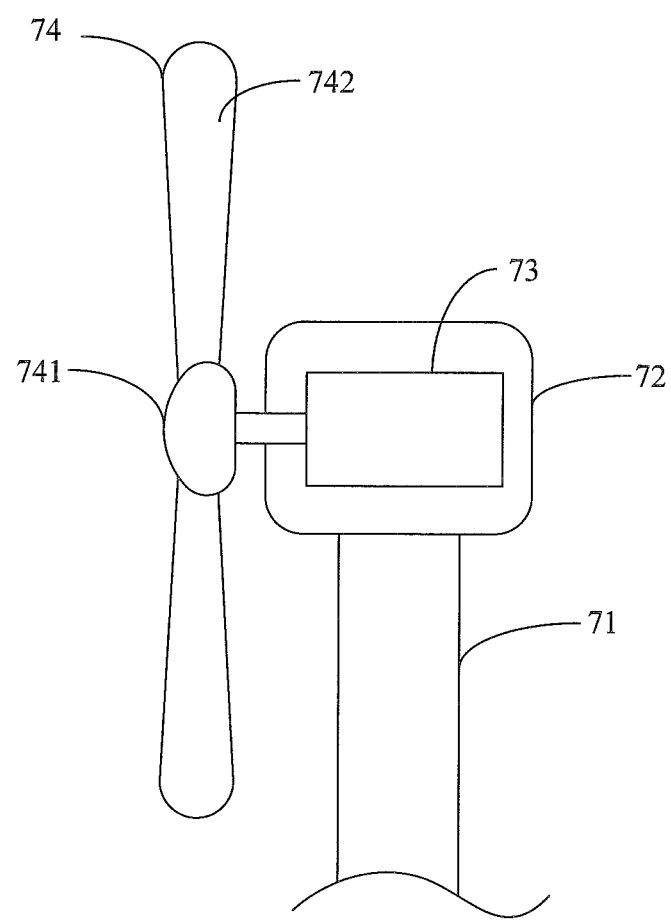
FIG. 13 is a diagram showing an overview of a direct-drive type wind generator system.

Note that the rotating electrical machine according to the first to fourth embodiments can be applied to, for example, an AC server motor, a motor of a vehicle, etc., and the like. This rotating electrical machine can also be applied to a wind generator system or a generator of a vehicle, etc., as well. An example in which the rotating electrical machine according to the first to fourth embodiments is applied to a generator of a wind generator system will now be described with reference to FIG. 12 and FIG. 13. FIG. 12 is a diagram showing an overview of a wind generator system having an accelerating gear and a generator. FIG. 13 is a diagram showing an overview of a direct-drive type wind generator system with the accelerating gear omitted.

The wind generator system shown in FIG. 12 mainly comprises a tower 61, a nacelle 62, a generator 63, an accelerating gear 64, and a windmill 65. The nacelle 62 is provided on the tower 61, and the generator 63 and the accelerating gear 64 are provided inside the nacelle 62. The generator 63 is any one of the rotating electrical machines according to the first to the fourth embodiments. The windmill 65 is made of a rotor hub 651 and a blade 652, and is connected to the generator 63 via the accelerating gear 64. The rotation of the windmill 65 is increased in speed by the accelerating gear 64 and transmitted to the generator 63. The wind generator system shown in FIG. 13 mainly comprises a tower 71, a nacelle 72, a generator 73, and a windmill 74. The nacelle 72 is provided on the tower 71, and the generator 73 is provided inside the nacelle 72. The generator 73 is any one of the rotating electrical machines according to the first to the fourth embodiments. The windmill 74 is made of a rotor hub 741 and a blade 742, and is connected to the generator 73.

In such a wind generator system, the rotational speed of the generator is often extremely low. As a result, in a case where the power generation capacity is high (in a case where the power generation capacity is several M [W], for example), a generator that produces high torque at low speed is required, resulting in generator having 30 to 100 magnetic poles and a large diameter. When a rotating electrical machine according to the above-described first to the fourth embodiments is applied to a generator of such a large diameter, the advantages according to the above-described first to fourth embodiments are even more remarkable.

Note that the wind generator system is not limited to the configurations shown in FIG. 12 and FIG. 13, other configurations can also be used.

Fifth Embodiment

Figure 14:
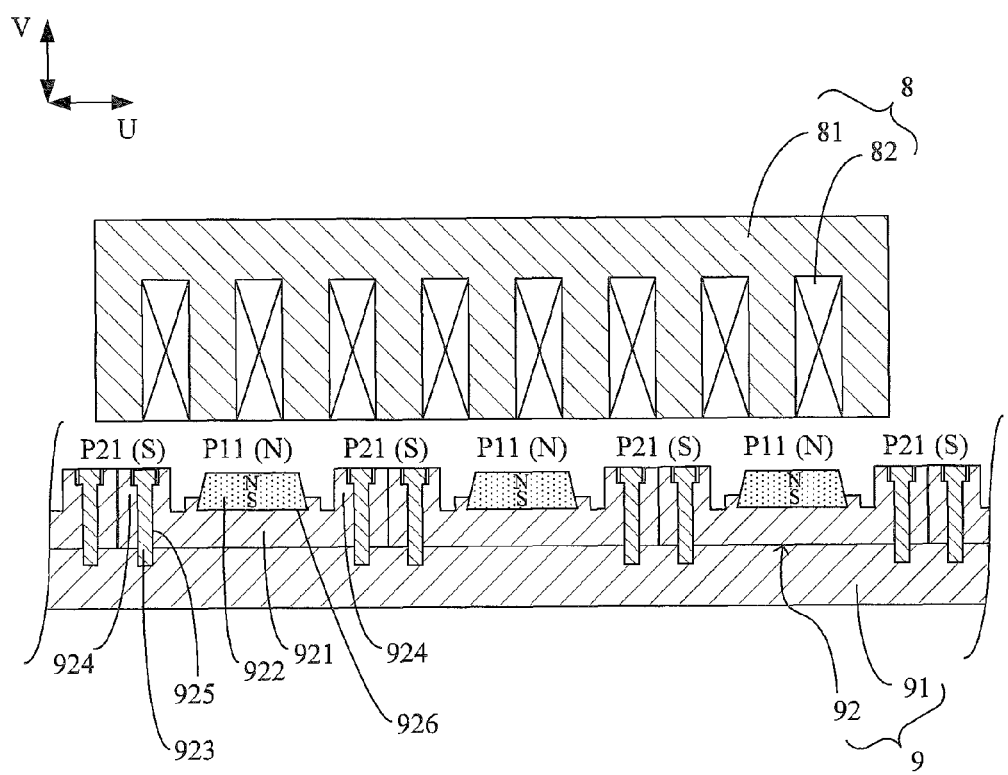
FIG. 14 is a front cross-sectional view of a linear motion electrical machine according to the fifth embodiment.

This embodiment describes a linear motion electrical machine. The linear motion electrical machine according to this embodiment may be a generator (linear generator) or a motor (linear motor). The following describes an exemplary configuration of a linear motion electrical machine according to this embodiment with reference to FIG. 14. FIG. 14 is a front cross-sectional view of a linear motion electrical machine according to the fifth embodiment.

In FIG. 14, the linear motion electrical machine comprises a mover 8 and a stator 9. The mover 8 moves in the U direction shown in FIG. 14. The mover 8 has a mover core 81 and a coil 82. The stator 9 faces the mover 8 via a gap. V in FIG. 14 indicates the facing direction in which the mover 8 faces the stator 9. The stator 9 has a stator core 91 and a magnetic pole unit 92. The magnetic pole unit 92 is equivalent to any one of the magnetic pole units according to the first to the fourth embodiments. Here, in this example, the magnetic pole unit used as the magnetic pole unit 92 is equivalent to the magnetic pole unit 23 according to the first embodiment.

The magnetic pole units 92 are aligned in the U direction on the mover 8 side of the stator core 91, and are fixed to the mover 8 side of the stator core 91 by a bolt 923 that is inserted into a bolt hole 925. The stator core 91 is a holding core that holds the magnetic pole unit 92. The magnetic pole unit 92 has a unit core 921, a permanent magnet 922, and the bolt 923. A projecting part 924 is formed on each end in the U direction of the unit core 921. The projecting part 924 protrudes toward the mover 8 side. The bolt hole 925 in which the bolt 923 is inserted is formed in the projecting part 924. The permanent magnet 922 has a trapezoidal cross-sectional shape, and is inserted into a groove part 926 formed in the unit core 921 and provided to the mover 8 side of the unit core 921. In addition, the permanent magnet 922 is disposed at the center of the unit core 921 in the U direction, and between the projecting parts 924 aligned in the U direction. The polarities of the mover 8 side and the unit core 921 side of the permanent magnet 922 are N and S, respectively. The projecting part 924 protrudes further toward the mover 8 side than the face of the mover 8 side of the permanent magnet 922.

Next, the magnetic poles formed on the stator 9 by the magnetic pole units 92 will be described. The permanent magnet 922 forms the first magnetic pole P11. Since the polarity of the mover 8 side of the permanent magnet 922 is N, the polarity of the mover 8 side of the first magnetic pole P11 is also N. The two projecting parts 924 adjacent in the U direction form the second magnetic pole P21 having convex polarity. The polarity of the mover 8 side of the second magnetic pole P21 is the same as the polarity of the unit core 921 side of the permanent magnet 922, and is thus S. With the magnetic pole units 92 forming such magnetic poles being aligned in the U direction, the first magnetic pole P11 and the second magnetic pole P21 alternately aligned in the U direction and forming mutually opposite polarities on the mover 8 side are formed on the mover 8 side of the stator 9. Namely, in the embodiment, the magnetic pole forming means recited in the claims consist of the magnetic pole unit 92. Thus, in a case where the linear motion electrical machine according to this embodiment is an electric motor, the mover 8 moves in the U direction by a magnetic field generated by the coil 82. On the other hand, in a case where the linear motion electrical machine according to this embodiment is a generator, the mover 8 moves in the U direction, causing voltage to be induced in the coil 82.

Thus, the magnetic pole unit can be applied not only to a rotating electrical machine, but to a linear motion electrical machine as well. With this arrangement, it is possible to significantly reduce the number of permanent magnets used in a linear motion electrical machine as well, making it possible to easily reduce the number of permanent magnets used.

Further, the permanent magnet used in the linear motion electrical machine is often a conductive rare earth magnet having Nd—Fe—B as its main component, in general. In such a case, eddy current loss occurs in the interior of the permanent magnetic, resulting in a reduction in efficiency. Nevertheless, according to this embodiment, the number of permanent magnets used can be significantly reduced, making it possible to significantly reducing the eddy current loss that occurs with permanent magnets in the linear motion electrical machine, in general. This makes it possible to improve the efficiency of the linear motion electrical machine.

Further, while according to the above the coil 82 is provided to the mover 8 and the magnetic pole unit 92 is provided to the stator 9, the present invention is not limited thereto. The coil 82 may be provided to the stator 9, and the magnetic pole unit 92 may be provided to the mover 8. In such a case, the mover core 81 becomes the holding core that holds the magnetic pole unit 92.

Further, while according to the above the stator core 91 is provided to the stator 9, the present invention is not limited thereto. The stator core 91 may be omitted, and the magnetic pole unit 92 may be directly arranged so as to plot a predetermined trajectory.

While some embodiments of the invention have been illustrated in detail, the invention is not limited to the embodiments shown; modifications and adaptations of the above embodiments, or suitable combinations of the techniques thereof with exemplary changes may occur to those skilled in the art. It is to be expressly understood that such modifications and adaptations are in the spirit and scope of the invention as set forth herein.

What is claimed is:

1. A rotating electrical machine comprising:
   a stator; and
   a rotor facing said stator and having a direction of rotation that is orthogonal to a direction facing to said stator;
   one of said stator and said rotor having a coil,
   the other of said stator and said rotor having:
      a plurality of magnetic pole units aligned in said direction of rotation, the magnetic pole units each forming first and second magnetic poles configured to be aligned alternately in said direction of rotation and to have mutually opposite polarities at a side of the one of said stator and said rotor; and
      a holding core configured to hold each of said magnetic pole units on the other of said stator and said rotor,
   each of said magnetic pole units comprising:
      a unit core;
      a permanent magnet; and
      a plurality of bolts,
   said unit core including:
      a first projecting part and a second projecting part formed on both ends respectively along said direction of rotation and configured to protrude toward the side of the one of said stator and said rotor along a radial direction;
      a plurality of first bolt holes configured to pass through said first projecting part along a radial direction;
      a plurality of second bolts holes configured to pass through said second projecting part along a radial direction; and
      a groove or a hole provided along an axial direction and provided at a middle portion between said plurality of first bolt holes of said first projecting part and said plurality of second bolt holes of said second projecting part along said direction of rotation, said bolts passing through said bolt holes respectively and fixing said unit core to an edge portion of said holding core in a radial direction, said permanent magnet being inserted in said groove or said hole, said first magnetic pole being formed by said permanent magnet, and said second magnetic pole being formed by each of said projecting parts adjacent along said direction of rotation.

2. The rotating electrical machine according to claim 1, wherein:

each of said magnetic pole units further comprises a unit core piece provided at one of said stator and said rotor side of said permanent magnet.

3. The rotating electrical machine according to claim 2, wherein:

said unit core piece is made of laminated magnetic steel sheets.

4. The rotating electrical machine according to claim 2, wherein:

each of said projecting parts protrudes toward the side of the one of said stator and said rotor more than said unit core piece.

5. The rotating electrical machine according to claim 1, wherein:

said permanent magnet is provided to an inside of said hole formed in said unit core.

6. The rotating electrical machine according to claim 5, wherein:

each of said projecting parts protrudes toward the side of the one of said stator and said rotor more than a part of said unit core, the part existing at the one of said stator and said rotor side of said permanent magnet.

7. The rotating electrical machine according to claim 1, wherein:

each of said projecting parts protrudes toward the side of the one of said stator and said rotor more than said permanent magnet.

8. The rotating electrical machine according to claim 1, wherein:

said unit core is made of laminated magnetic steel sheets.

9. The rotating electrical machine according to claim 8, wherein:

adhesive is coated on both surfaces of said magnetic steel sheets.

10. The rotating electrical machine according to claim 1, wherein:

said other of said stator and said rotor has a plurality of unit groups aligned in a direction of an axis of rotation of said rotor, the unit groups comprising each of said magnetic pole units aligned along said direction of rotation, said plurality of unit groups comprises:

a first unit group having a north polarity on the side of the one of said stator and said rotor of said first magnetic pole; and a second unit group having a south polarity on the side of the one of said stator and said rotor of said first magnetic pole and provided in a quantity equivalent to that of said first unit group, and the first magnetic pole of said first unit group and the second magnetic pole of said second unit group are disposed in an identical position in the direction of rotation, and the second magnetic pole of said first unit group and the first magnetic pole of said second unit group are disposed in an identical position in the direction of rotation, as viewed from said direction of the axis of rotation.

11. A linear motion electrical machine comprising:

a stator; and a mover facing said stator and having a direction of movement that is orthogonal to a direction facing to said stator;

one of said stator and said mover having a coil, the other of said stator and said mover having:

a plurality of magnetic pole units aligned in said direction of movement, the magnetic pole units each forming first and second magnetic poles configured to be aligned alternately in said direction of movement and to have mutually opposite polarities at a side of the one of said stator and said mover; and a holding core configured to hold each of said magnetic pole units on the other of said stator and said rotor, each of said magnetic pole units comprising:

a unit core;

a permanent magnet; and a plurality of bolts, said unit core including:

a first projecting part and a second projecting part formed on both ends respectively along said direction of movement and configured to protrude toward the side of the one of said stator and said mover along an orthogonal direction orthogonal to said direction of movement;

a plurality of first bolt holes configured to pass through said first projecting part along the orthogonal direction;

a plurality of second bolts holes configured to pass through said second projecting part along the orthogonal direction; and a groove or a hole provided at a middle portion between said plurality of first bolt holes of said first projecting part and said plurality of second bolt holes of said second projecting part along said direction of movement, said bolts passing through said bolt holes respectively and fixing said unit core to an edge portion of said holding core in the orthogonal direction, said permanent magnet being inserted in said groove or said hole, said first magnetic pole being formed by said permanent magnet, and said second magnetic pole being formed by each of said projecting parts adjacent along said direction of movement.

12. A wind generator system having a generator, the generator comprising:

a stator; and a rotor facing said stator and having a direction of rotation that is orthogonal to a direction facing to said stator;

one of said stator and said rotor having a coil, the other of said stator and said rotor having:

a plurality of magnetic pole units aligned in said direction of rotation, the magnetic pole units each forming first and second magnetic poles configured to be aligned alternately in said direction of rotation and to have mutually opposite polarities at a side of the one of said stator and said rotor; and a holding core configured to hold each of said magnetic pole units on the other of said stator and said rotor, each of said magnetic pole units comprising:

a unit core;

a permanent; and a plurality of bolts, said unit core including:
- a first projecting part and a second projecting part formed on both ends respectively along said direction of rotation and configured to protrude toward the side of the one of said stator and said rotor along a radial direction;
- a plurality of first bolt holes configured to pass through said first projecting part along a radial direction;
- a plurality of second bolts holes configured to pass through said second projecting part along a radial direction; and
- a groove or a hole provided along an axial direction and provided at a middle portion between said plurality of first bolt holes of said first projecting part and said plurality of second bolt holes of said second projecting part along said direction of rotation, said bolts passing through said bolt holes respectively and fixing said unit core to an edge portion of said holding core in a radial direction, said permanent magnet being inserted in said groove or said hole, said first magnetic pole being formed by said permanent magnet, and said second magnetic pole being formed by each of said projecting parts adjacent along said direction of rotation.

13. The wind generator system according to claim 12, further comprising:
- a tower;
- a nacelle provided to said tower;
- said generator provided to said nacelle; and
- a windmill directly or indirectly connected to said generator.

* * * * *